(12) United States Patent
Sakamoto

(10) Patent No.: US 9,505,090 B2
(45) Date of Patent: Nov. 29, 2016

(54) VEHICLE BODY MANUFACTURING APPARATUS

(71) Applicant: Fuji Jukogyo Kabushiki Kaisha, Tokyo (JP)

(72) Inventor: Noboru Sakamoto, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/845,133

(22) Filed: Sep. 3, 2015

(65) Prior Publication Data

US 2016/0068208 A1 Mar. 10, 2016

(30) Foreign Application Priority Data

Sep. 4, 2014 (JP) ................................ 2014-180549

(51) Int. Cl.
| | | |
|---|---|---|
| B25B 27/00 | (2006.01) | |
| B23K 37/047 | (2006.01) | |
| B23K 11/11 | (2006.01) | |
| B23K 11/31 | (2006.01) | |
| B23K 37/04 | (2006.01) | |

(52) U.S. Cl.
CPC ............ *B23K 37/047* (2013.01); *B23K 11/115* (2013.01); *B23K 11/315* (2013.01); *B23K 37/0443* (2013.01); *B23K 2201/006* (2013.01); *B23K 2203/04* (2013.01)

(58) Field of Classification Search
CPC .... B62D 65/026; B62D 65/02; B62D 65/06; B62D 65/18; B62D 65/024; B62D 65/022; B23K 37/047; B23K 37/0443; B23K 37/0408
See application file for complete search history.

(56) References Cited

U.S. PATENT DOCUMENTS

| | | | | |
|---|---|---|---|---|
| 4,667,866 A | * | 5/1987 | Tobita ................. | B23K 37/047 219/79 |
| 5,902,496 A | * | 5/1999 | Alborante ............ | B23K 37/047 219/158 |
| 6,438,842 B1 | * | 8/2002 | Raami .................... | B62D 65/00 228/49.1 |
| 7,100,271 B2 | * | 9/2006 | Baulier .................. | B23K 37/04 29/711 |
| 8,046,895 B2 | * | 11/2011 | Sherrill .................... | B25J 9/009 29/281.1 |
| 8,181,347 B2 | * | 5/2012 | Martinais ............... | B62D 65/02 269/37 |
| 8,950,647 B2 | * | 2/2015 | Magnano ........... | B23K 37/0408 228/43 |

FOREIGN PATENT DOCUMENTS

| | | |
|---|---|---|
| JP | H 64-011077 A | 1/1989 |
| JP | H 64-012978 A | 1/1989 |
| JP | H 06-59851 B2 | 8/1994 |
| JP | 2003-146265 A | 5/2003 |

OTHER PUBLICATIONS

JPO Decision to Grant a Patent dated Aug. 25, 2015.

* cited by examiner

*Primary Examiner* — Lee D Wilson
(74) *Attorney, Agent, or Firm* — McGinn IP Law Group, PLLC.

(57) ABSTRACT

A vehicle body manufacturing apparatus includes: a jig frame structure in which an upper jig frame out of multiple upper jig frames is replaceably disposed according to a vehicle type; a clamp jig that clamps a work of a vehicle body supported by the jig frame structure; an articulated arm that supports the clamp jig movably relative to the vehicle body; a fitting member provided in the clamp jig; and a fitting receiving member that is provided in the upper jig frame and guides the clamp jig to a predetermined clamp position of the vehicle body by fitting to the fitting member.

19 Claims, 10 Drawing Sheets

United States Patent US 9,505,090 B2

VEHICLE BODY MANUFACTURING APPARATUS

CROSS-REFERENCE TO RELATED APPLICATIONS

The present application claims priority from Japanese Patent Application No. 2014-180549 filed on Sep. 4, 2014, the entire contents of which are hereby incorporated by reference.

BACKGROUND

1. Technical Field

The present invention relates to a vehicle body manufacturing apparatuses that weld one work of a temporarily fixed vehicle body to another work to pre-assemble the vehicle body.

2. Related Art

There have been proposed and put into practical use various techniques for assembling a vehicle body by spot welding multiple works included in the vehicle body with the works positioned.

As a technique for assembling multiple types of vehicle body using this type of manufacturing apparatus, for instance, Japanese Published Examined Patent Application Publication (JP-B) No. 6-59851 discloses a technique that uses a vehicle body manufacturing apparatus to assemble multiple types of vehicle body having shapes at clamp positions of the vehicle body in common between vehicle body models, the vehicle body manufacturing apparatus including: multiple 3 axis switching units that each serve as a clamping device for positioning with a body side and a roof and that are suspension-supported and provided on both right and left sides of an upper frame of a vehicle body assembly station; and multiple 3 axis switching units that each serve as a clamping device for positioning with a body side and an under body and that are provided on both right and left sides of a lower frame of the vehicle body assembly station.

However, the clamping device disclosed in JP-B No. 6-59851 adopts the 3 axis switching units for positioning of a clamp jig, and thus some constraints are imposed. For example, shapes at clamp positions have to be provided in common between vehicle body models.

Although an articulated arm may be adopted for positioning of a clamp jig, it is difficult to position the clamp jig with high accuracy by simply adopting an articulated arm.

SUMMARY OF THE INVENTION

The present invention has been made in view of the above-described situations and aims to provide a vehicle body manufacturing apparatus capable of clamping works of multiple types of vehicle body with high accuracy and flexibility.

An aspect of the present invention provides a vehicle body manufacturing apparatus including: a jig frame structure in which at least one of jig frames is a replaceable jig frame that is replaceable according to a vehicle type; at least clamp jig that clamps a work of a vehicle body supported by the jig frame structure; an articulated arm that supports the clamp jig movably relative to the vehicle body; a fitting member provided in the clamp jig; and a fitting receiving member that is provided in the replaceable jig frame and guides the clamp jig to a predetermined clamp position of the vehicle body by fitting to the fitting member.

DETAILED DESCRIPTION

Figure 1:
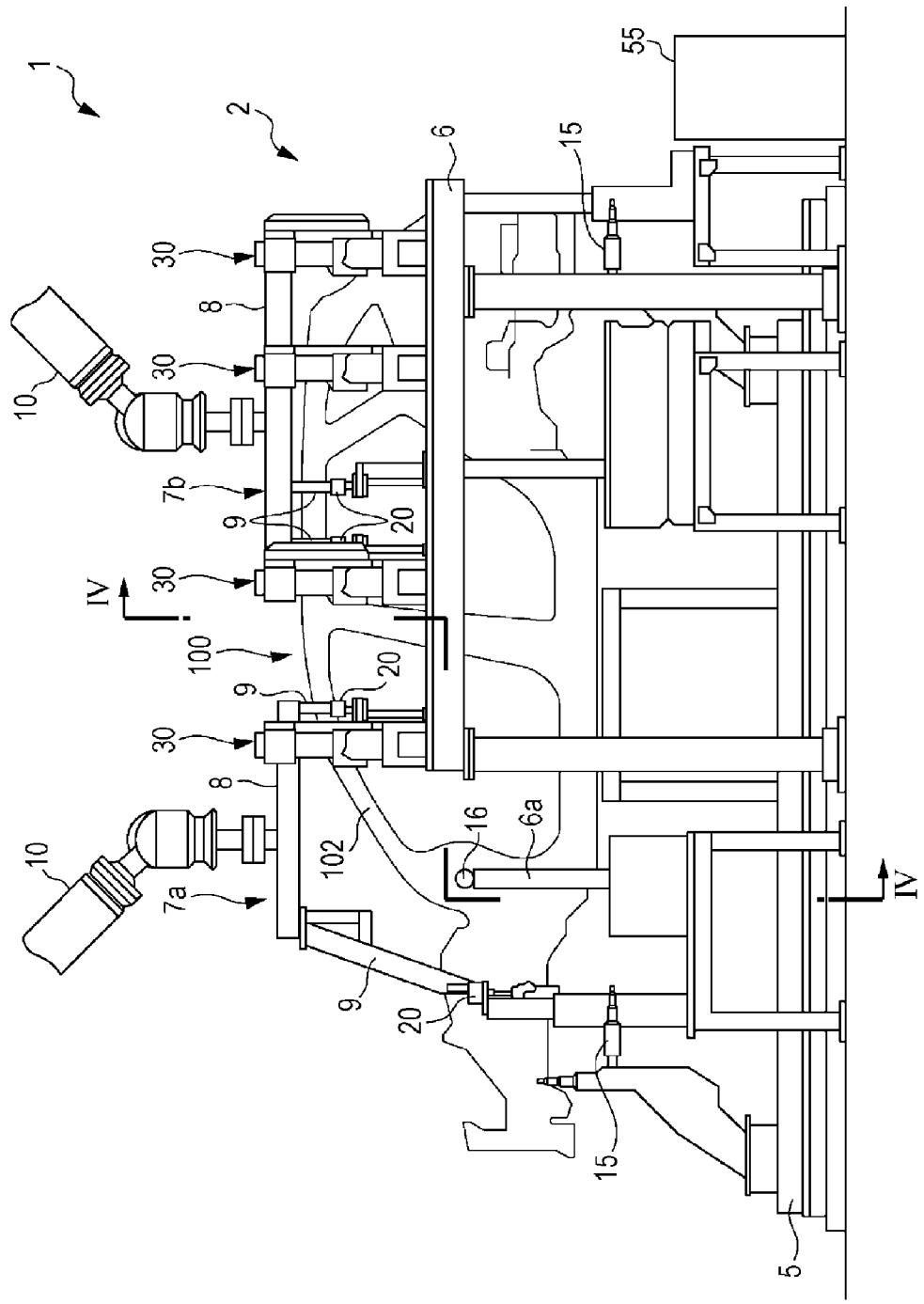
FIG. 1 is a side view illustrating the schematic configuration of a vehicle body manufacturing apparatus according to an implementation of the present invention.
Figure 2:
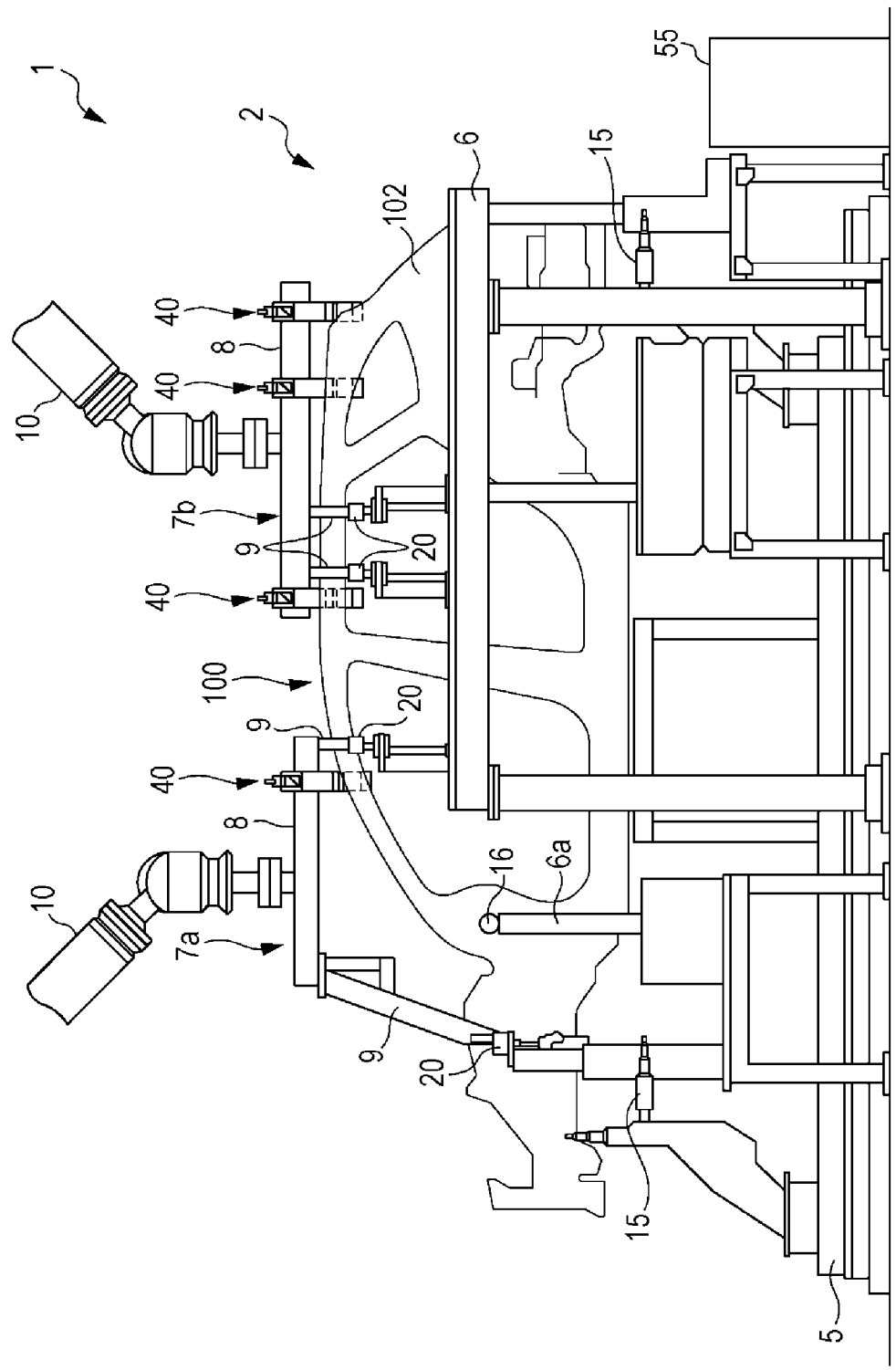
FIG. 2 is a side view illustrating the schematic configuration of the vehicle body manufacturing apparatus with a clamp robot removed.
Figure 3:
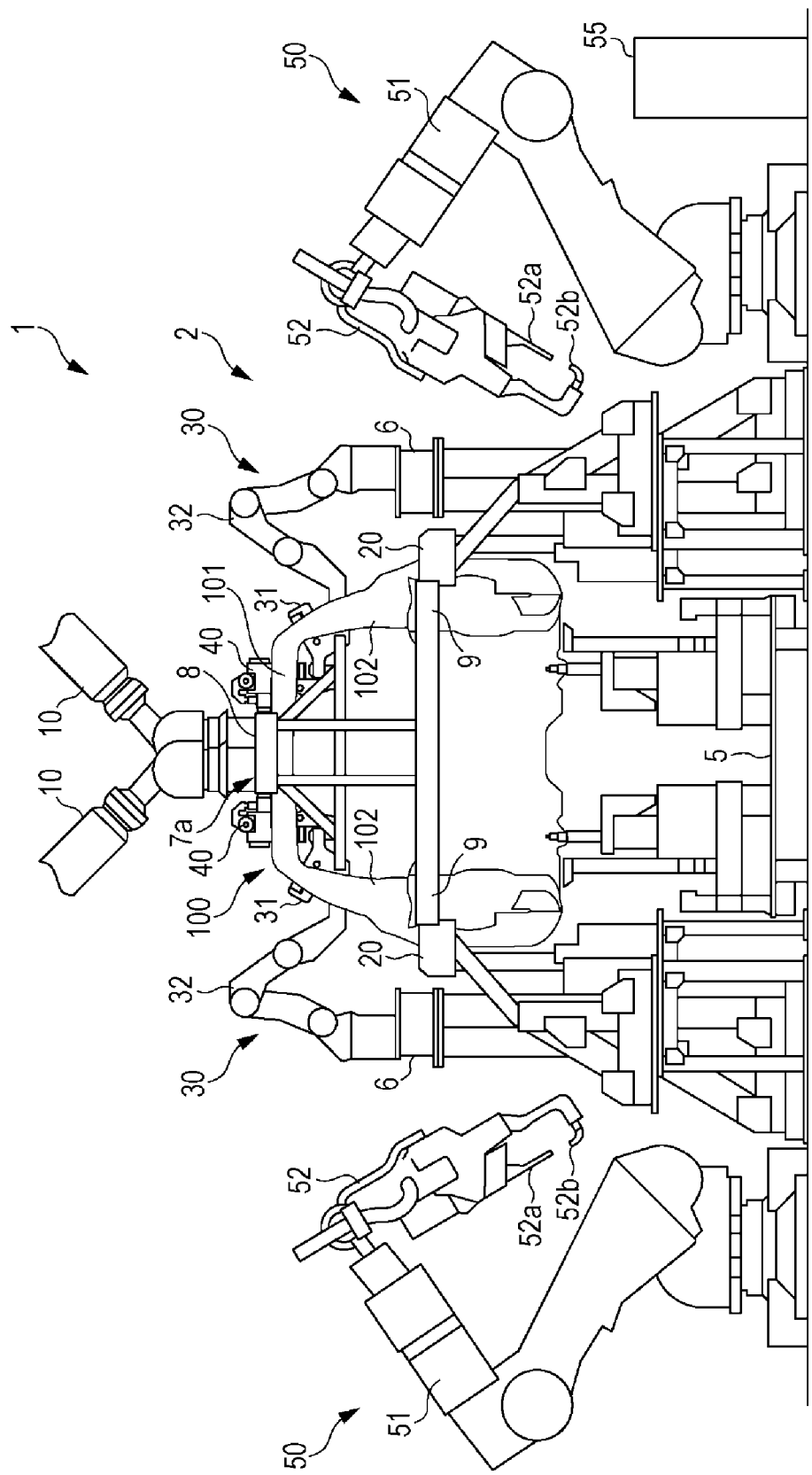
FIG. 3 is a front view illustrating the schematic configuration of the vehicle body manufacturing apparatus.
Figure 4:
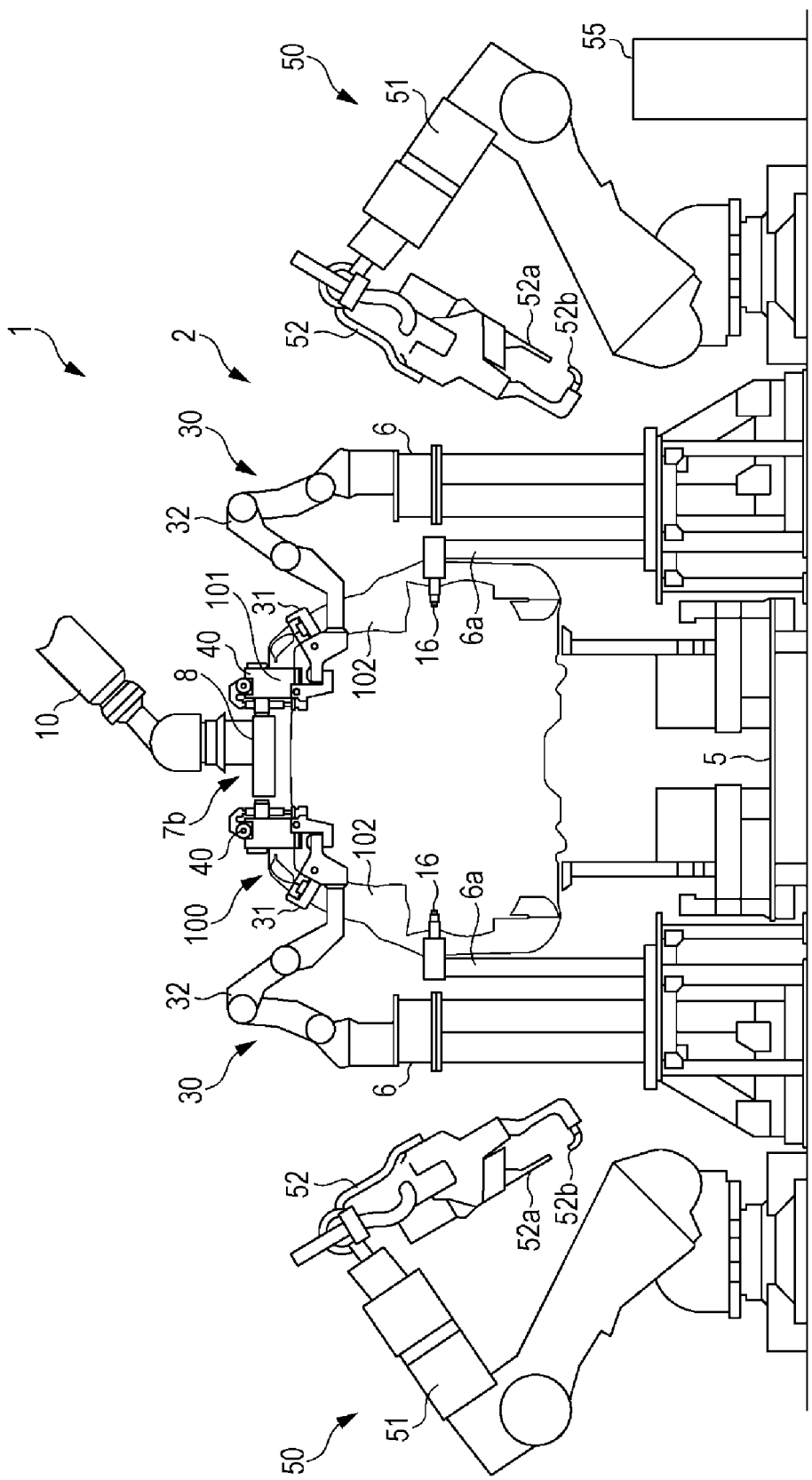
FIG. 4 is a view as seen in the direction of arrows IV-IV of FIG. 1.
Figure 5:
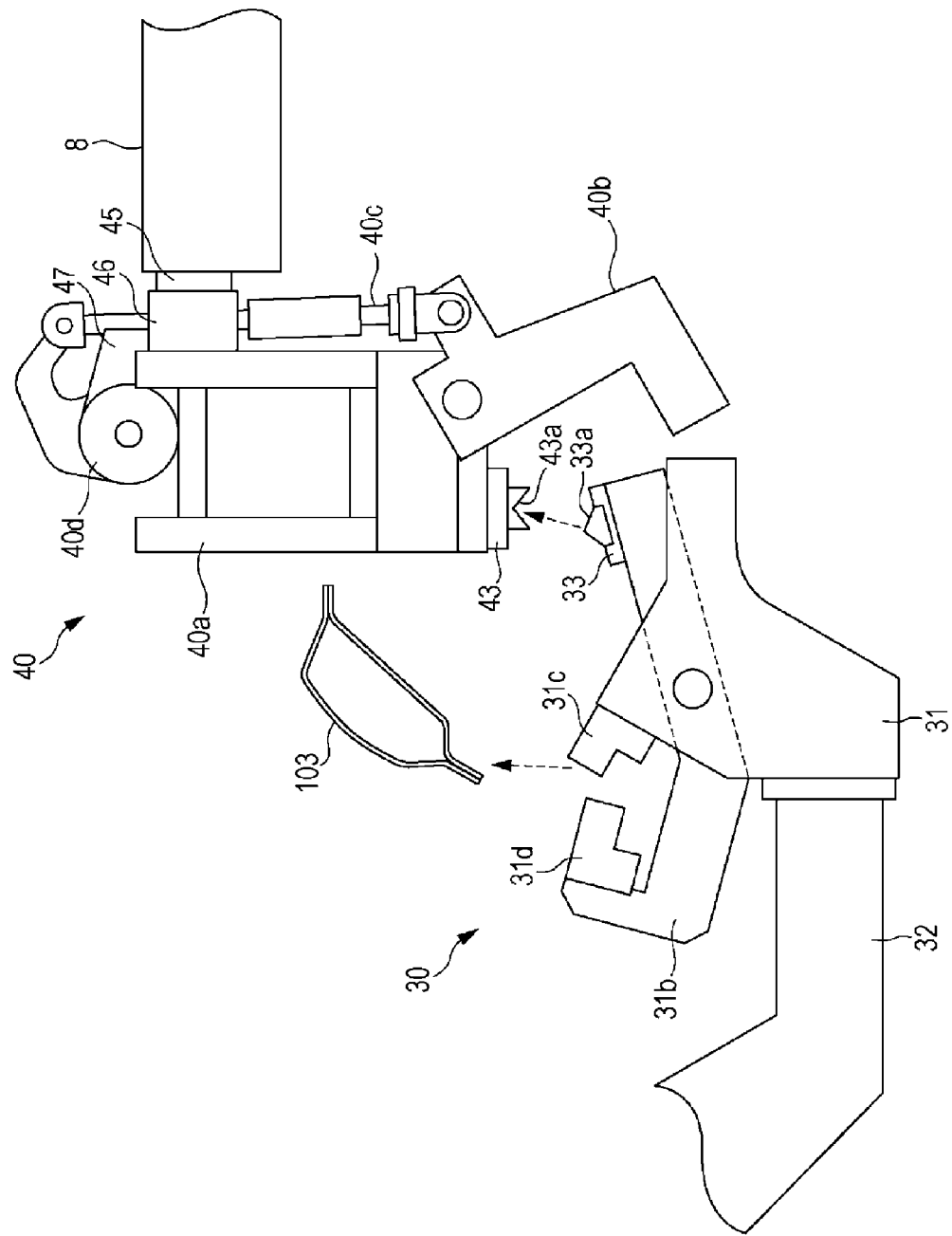
FIG. 5 illustrates the relationship between a clamp jig and a locking mechanism before clamping.
Figure 6:
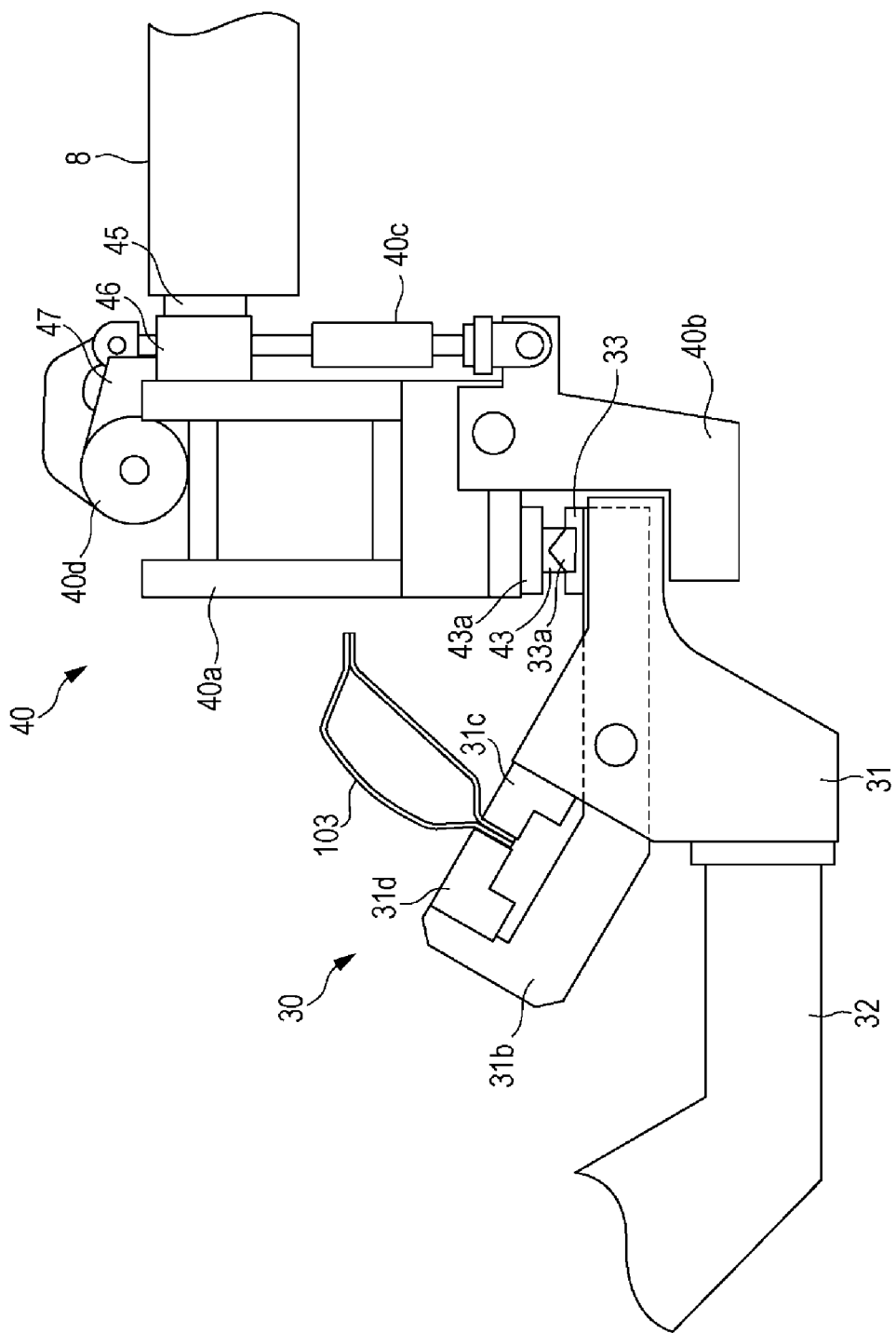
FIG. 6 illustrates the relationship between the clamp jig and the locking mechanism at the time of clamping.
Figure 7:
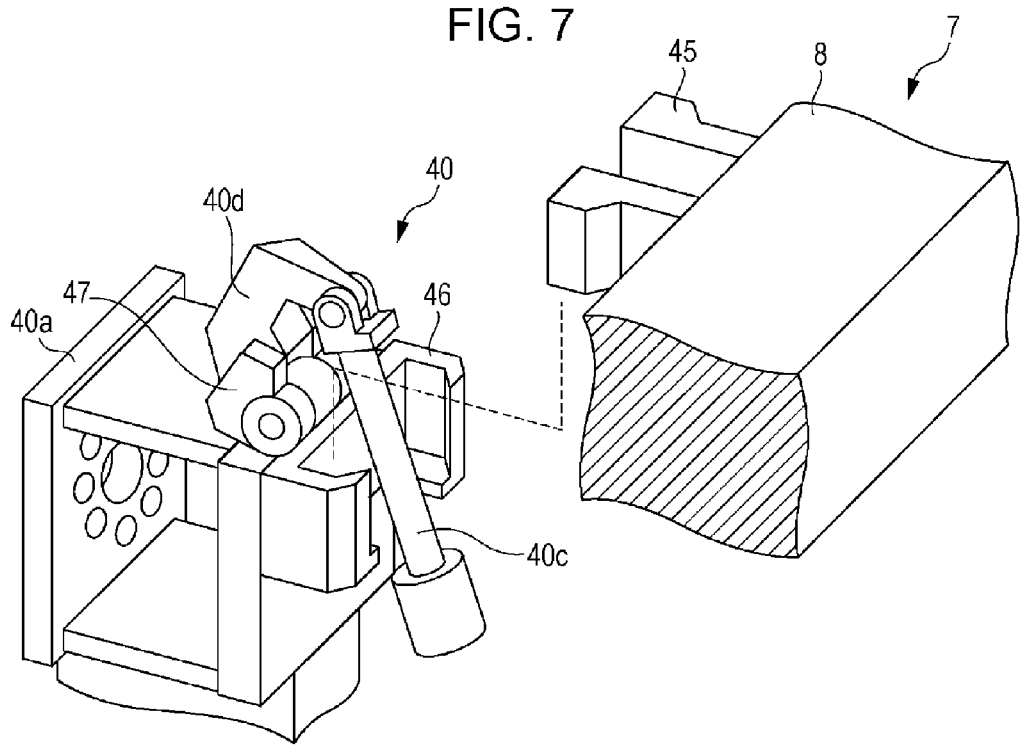
FIG. 7 is a perspective view illustrating the relationship between the locking mechanism of the clamp jig and an upper jig frame.
Figure 8:
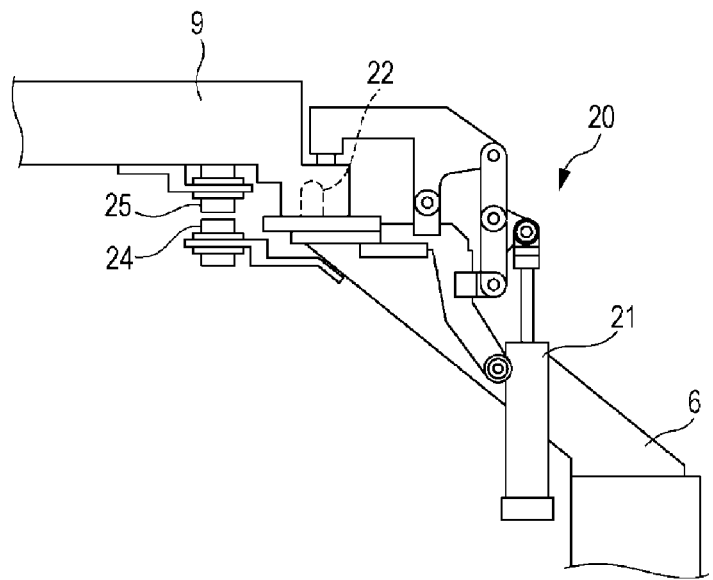
FIG. 8 is a front view illustrating the locking mechanism between a side jig frame and the upper jig frame.
Figure 9:
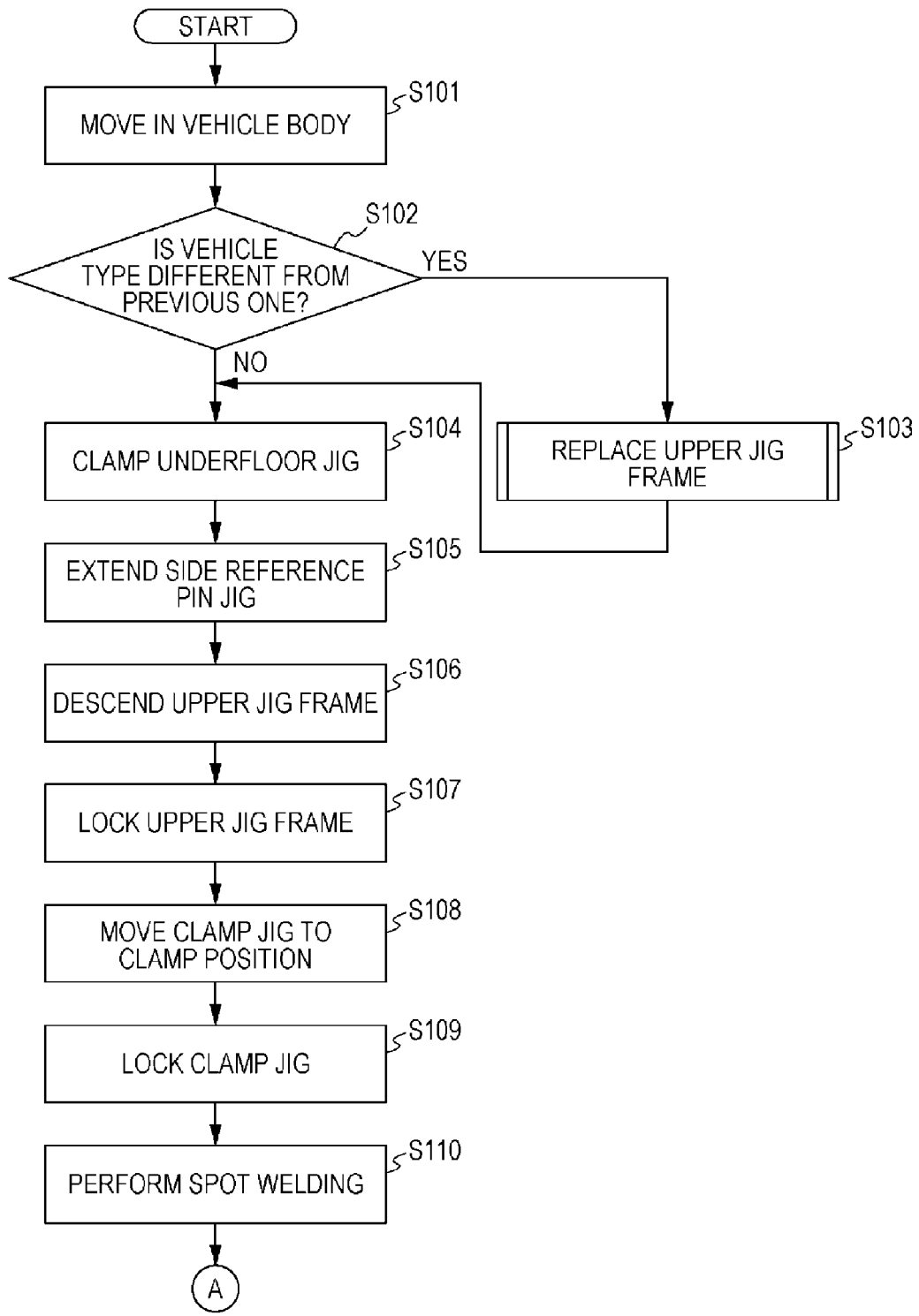
FIG. 9 is a flow chart (part 1) illustrating a pre-assembly welding process for structures including side structures.
Figure 10:
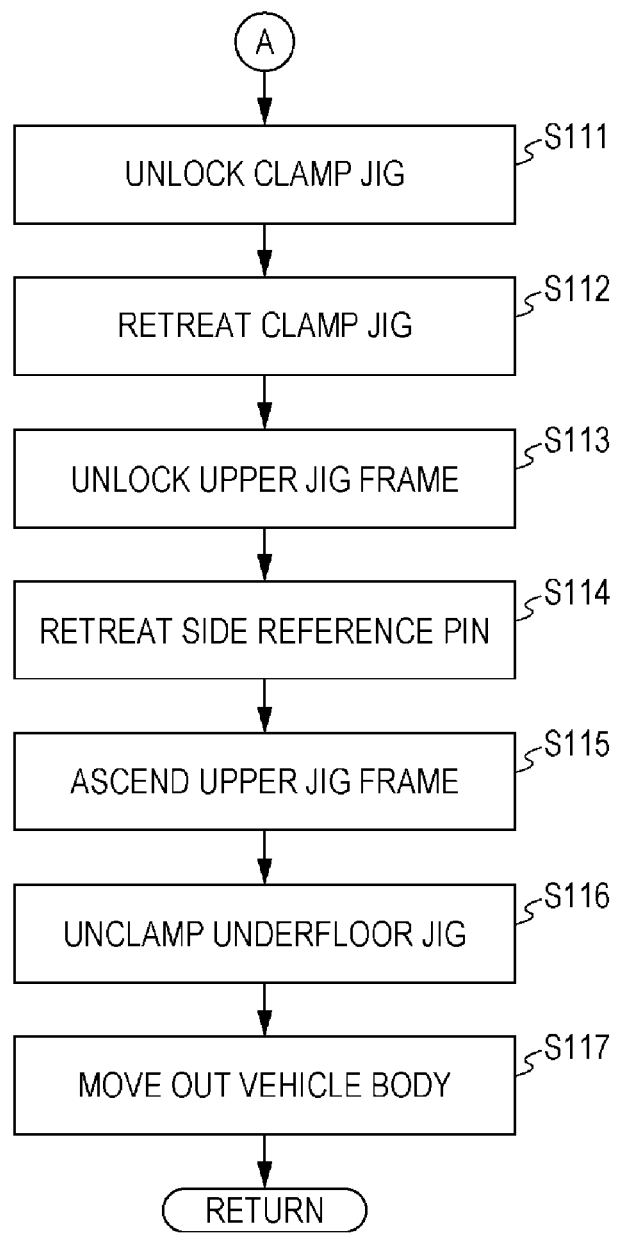
FIG. 10 is a flow chart (part 2) illustrating the pre-assembly welding process for structures including side structures.
Figure 11:
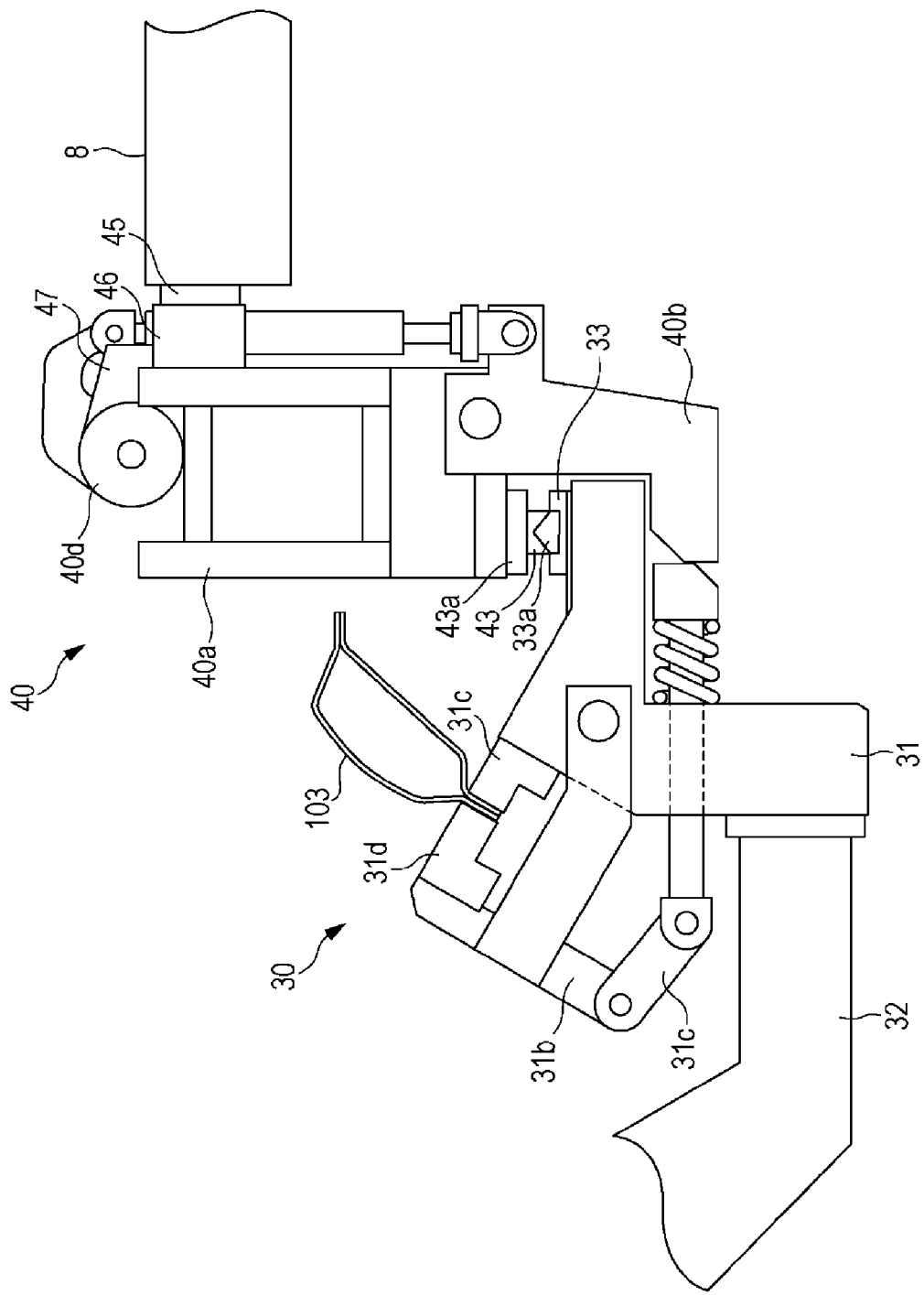
FIG. 11 is illustrates the relationship between the clamp jig and the locking mechanism at the time of clamping according to a modification.

Hereinafter, an implementation of the present invention will be described with reference to the drawings. The drawings are related to the implementation of the present invention. FIG. 1 is a side view illustrating the schematic configuration of a vehicle body manufacturing apparatus; FIG. 2 is a side view illustrating the schematic configuration of the vehicle body manufacturing apparatus with a clamp robot removed; FIG. 3 is a front view illustrating the schematic configuration of the vehicle body manufacturing apparatus; FIG. 4 is a view as seen in the direction of arrows IV-IV of FIG. 1; FIG. 5 illustrates the relationship between a clamp jig and a locking mechanism before clamping; FIG. 6 illustrates the relationship between the clamp jig and the locking mechanism at the time of clamping; FIG. 7 is a perspective view illustrating the relationship between the locking mechanism of the clamp jig and an upper jig frame; FIG. 8 is a front view illustrating the locking mechanism between a side jig frame and the upper jig frame; FIGS. 9 and 10 are a flow chart illustrating a pre-assembly welding process for structures including side structures; and FIG. 11 is illustrates a modification of the relationship between the clamp jig and the locking mechanism at the time of clamping.

A vehicle body manufacturing apparatus 1 illustrated in FIGS. 1 to 4 is formed, for instance, in a stage of pre-assembly welding process set in an assembly line for the main body of the frame of an automobile. In the stage of the assembly process, for instance, a vehicle body 100 is fixedly installed (clamped) on an underfloor jig 5 and is transported in by a shuttle conveyer (not illustrated) or the like, the vehicle body 1 in which a side structure 102, that is a side structural parts is temporarily fixed to each of both sides of a center structure 101 that is a lower central structural part.

The center structure 101 includes, for instance, a front wheel apron, a toe board, a front floor, and a rear wheel apron. The side structure 102 includes, for instance, a front pillar, a center pillar, a rear quarter pillar, a side rail, and a side sill.

In the stage of the assembly process, a side jig frame 6 is provided for each of the right and left side structures 102 of the vehicle body 100, the side jig frame 6 facing corresponding one of the side structures 102. A jig reference pin 15 provided in the underfloor jig 5 is engageable with corresponding one of the side jig frames 6, and the underfloor jig 5 is positioned and fixed (clamped) on the stage by the jig reference pin 15.

Part of the side jig frame 6 is a movable jig frame 6a that is movable closer to and away from corresponding one of the right and left side structures 102. When the vehicle body 100 is transported in as the process proceeds from another process to the present process or when the vehicle body 100 is transported out as the process proceeds from the present process to another process, each movable jig frame 6a is moved in a direction away from the vehicle body 100. On the other hand, when the underfloor jig 5 along with the vehicle body 100 is transported in the stage of the present process and installed and fixed, the movable jig frame 6 is moved in a direction closer to the vehicle body 100, and each side structure 102 is positioned and fixed (clamped) by the side reference pin 16 provided in the corresponding movable jig frame 6a.

The manufacturing apparatus 1 includes multiple types of upper jig frame front 7a and multiple types of upper jig frame rear 7b as jig frames each of which is replaceable according to the vehicle type of the transported vehicle body 100. In FIGS. 1 to 4, a set of upper jig frame front 7a and upper jig frame rear 7b selected from the multiple types is illustrated. In the following description, those jig frames are collectively referred to as the upper jig frame 7 as appropriate.

The upper jig frame front 7a and the upper jig frame rear 7b are selectively transported from a jig storage (not illustrated) by respective upper jig transport robots 10, and are each installed from above the vehicle body 100 between the right and left side jig frames 6 when the right and left side jig frames 6 are positioned and fixed at a position close to the vehicle body 100. Thus, the upper jig frame front 7a and the upper jig frame rear 7b each have a jig frame main body 8 and legs 9, the jig frame main body 8 extending in a fore-and-aft direction over the vehicle body 100, the legs 9 extending to the right and left under the jig frame main body 8. For the upper jig frame front 7a and the upper jig frame rear 7b, each leg 9 is placed on the side jig frame 6 by numerical control (NC) on the upper jig transport robots 10, and is positioned and fixed by a frame locking mechanism 20 provided in the side jig frame 6.

In the present implementation, as illustrated in FIG. 8, the frame locking mechanism 20 is, for instance, a link locking mechanism that causes an air cylinder 21 to operate as an actuator. At a clamp position of the frame locking mechanism 20, a positioning pin 22 for positioning the leg 9 is provided in a projecting manner. Also, the side jig frame 6 and the leg 9 are provided with couplers 24 and 25 that are opposed to each other when the leg 9 is positioned by the positioning pin 22. The air cylinder 21 is operationally controlled in conjunction with the opposed couplers 24 and 25, and thus the frame locking mechanism 20 fixes the leg 9 to the side jig frame 6.

In a jig frame structure 2 having such a configuration, each side jig frame 6 is provided with clamp robots 30. As illustrated in FIGS. 5 and 6, the clamp robots 30 each include a clamp jig 31 and an articulated arm 32, the clamp jig 31 for clamping a predetermined portion (portion to be clamped) of a work 103 of the vehicle body 100 temporarily placed, the articulated arm 32 for supporting the clamp jig 31 movably relative to the vehicle body 100.

As illustrated in FIGS. 5 and 6, the clamp jig 31 includes a clamp jig main body 31a connected to the articulated arms 32, a clamp lever 31b rockably pivotally supported by the clamp jig main body 31a, a fixed clamp 31c fixedly provided at the clamp jig main body 31a, and a movable clamp 31d fixedly provided at one end of the clamp lever 31b. The clamp jig 31 is capable of clamping the work 103 by rocking operation of the clamp lever 31b, the rocking operation causing the movable clamp 31d to move to a position close to the fixed clamp 31c.

Furthermore, in the present implementation, a fitting member 33 formed of a metal block or the like is fixedly provided at the other end of the clamp lever 31b. In the present implementation, the fitting member 33 includes a mountain-like projection 33a having inclined surfaces on both sides.

In addition, the upper jig frame 7 is provided with locking mechanisms 40 that each position and fix a clamp jig 31 at a predetermined clamp position. As illustrated in FIGS. 5 and 6, each of the locking mechanisms 40 in the present implementation includes a locking mechanism main body 40a supported by the jig frame main body 8 of the upper jig frame 7, a locking lever 40b rockably pivotally supported by the locking mechanism main body 40a, and an actuator 40d that causes a rocking operation of the locking lever 40b via a rod 40c. In the present implementation, the locking lever 40b is capable of integrally clamping and locking part of the clamp jig main body 31a and the other end of the clamp lever 31b between the locking lever 40b and the locking mechanism main body 40a. Rocking of the clamp lever 31b caused by the clamping allows the clamp jig 31 to clamp the work 103 of the vehicle body 100.

In order to guide the clamp jig 31 to a predetermined clamp position of the vehicle body 100, a fitting receiving member 43 to be fitted to the fitting member 33 is fixedly provided in the locking mechanism main body 40a at a position facing the end of the locking lever 40b. In the present implementation, the fitting receiving member 43 has a V-shaped groove 43a that corresponds to the projection 33a of the fitting member 33. When the other end of the clamp lever 31b is locked by the locking lever 40b, the projection 33a of the fitting member 33 is fitted into the groove 43a of the fitting receiving member 43, and thus the clamp jig 31 is guided to a clamp position of the vehicle body 100 to clamp the work 103 with high accuracy.

For instance, as illustrated in FIG. 7 the locking mechanism 40 in the present implementation is detachably connectable to the upper jig frame 7 via a bracket 45 that is fixedly provided in the jig frame main body 8 of the upper jig frame 7. In the present implementation, the bracket 45 includes a pair of projection members that are substantially L-shaped in plan view. In order to be connected to the bracket 45, the locking mechanism main body 40a is provided with a slide rail 46 having a closed lower end and a retaining member 47 that faces the upper end of the slide rail 46 in an extendable and retractable manner. When the locking mechanism 40 is connected to the upper jig frame 7 (jig frame main body 8), the locking mechanism 40 is supported by a robot (not illustrated) and is moved so that the slide rail 46 is engaged with the bracket 45 from a lower position. After the slide rail 46 is engaged with the bracket 45, the retaining member 47 faces the upper end of the slide rail 46, thereby avoiding falling off of the slide rail 46 from the bracket 45 and maintaining the connection between the upper jig frame 7 and the locking mechanism 40. The mounting position, mounting angle on the upper jig frame 7 of each bracket 45 connecting and supporting the locking mechanism 40 in this manner, are set individually for each upper jig frame 7 as appropriate, and thus the locking mechanism 40 may be used in common among the upper jig frames 7 of different vehicle types.

As illustrated in FIGS. 3 and 4, welding robots 50 are disposed at desired positions near lateral sides of the jig frame structure 2. Each of the welding robots 50 includes an arm 51 and a welding gun 52, the arm 51 being movable relative to the vehicle body 100, the welding gun 52 being supported on the end of the arm 51. The welding gun 52 performs spot welding on what is called interstitial free (IF) steel, and includes a movable side electrode 52a and a fixed side electrode 52b, the movable side electrode 52a being movable along a pressure axis defined at the end of the arm 51, the fixed side electrode 52b being opposed to the movable side electrode 52a and fixed on the pressure axis of the movable side electrode 52a to clamp a welding section together with movement of the movable side electrode 52a and to perform spot welding with a predetermined pressure force.

Each functional unit of the manufacturing apparatus 1 configured as described above is provided with control panels (not illustrated) and those control panels are collectively controlled by a program or the like that is installed in a process control panel 55, and thus, for instance the pre-assembly welding process illustrated in FIGS. 9 and 10 is performed.

Specifically, when the vehicle body 100 is transported from another process to the present process (pre-assembly welding process) (step S101), the process control panel 55 reads an identifier of the vehicle body 100 in step S102, and checks to see whether or not the vehicle body 100 transported this time is different in vehicle type from a vehicle body 100 transported last time.

When the transported vehicle body 100 is determined to be different in vehicle type in step S102, the flow proceeds to step S103, and the process control panel 55 replaces the upper jig frame 7. Specifically when the flow proceeds from step S102 to step S103, the process control panel 55 operates an upper jig transport robot 10 to transport the upper jig frame 7 currently held by the upper jig transport robot 10 to the jig storage so that the upper jig frame 7 is separated from the upper jig transport robot 10. Subsequently, the process control panel 55 moves the upper jig transport robot 10 to a jig storage corresponding to the current vehicle type, and connects a new relevant upper jig frame 7 to the upper jig transport robot 10, then the flow proceeds to step S104. In the above process, the process control panel 55 operates a robot (not illustrated) to remove the locking mechanism 40 from the upper jig frame 7 used in the previous process, and mounts the removed locking mechanism 40 on a new upper jig frame 7. It is to be noted that in such replacement of the upper jig frame 7, for instance when the difference between vehicle types is only the difference between sedan type and wagon type vehicle bodies, it is sufficient to replace the upper jig frame rear 7b only.

On the other hand, in step S102, when it is determined that the vehicle body 100 transported this time is the same as the vehicle body 100 transported last time in vehicle type, the flow proceeds to step S104.

When the flow proceeds from step S102 or step S103 to step S104, the process control panel 55 causes the jig reference pin 15 provided in the underfloor jig 5 to extend to the side jig frame 6 to clamp the underfloor jig 5.

In subsequent step S105, the process control panel 55 causes the movable jig frame 6a of the side jig frame 6 to extend to the side structure 102 to clamp the side structure 102 with the side reference pin 16.

In subsequent step S106, the process control panel 55 causes the upper jig transport robot 10 to operate and lower the upper jig frame 7 to the installation position of the side jig frame 6.

The leg 9 of the upper jig frame 7 is then positioned by the positioning pin 22 which projects from the frame locking mechanism 20 of the side jig frame 6. When the couplers 24 and 25 are opposed to each other (see FIG. 8), the process control panel 55 causes the air cylinder 21 to operate in step S107 to lock the leg 9 of the upper jig frame 6 with the frame locking mechanism 20.

When the jig frame structure 2, which supports the vehicle body 100, is assembled in these steps, the process control panel 55 moves each clamp jig 31 to each clamp position set on the vehicle body 100 by numerical control (NC) on the articulated arm 32 of each clamp robot 30 in step S108. Accordingly, the fitting member 33 provided in each clamp jig 31 is disposed at a predetermined position so as to be fitted to the fitting receiving member 43 provided in the corresponding locking mechanism 40.

In subsequent step S109, the process control panel 55 causes the actuator 40d of the locking mechanism 40 to operate and clamp part of the clamp jig main body 31a and the other end of the clamp lever 31b between the locking mechanism main body 40a and the locking lever 40b (lock the clamp jig 31). Accordingly, the projection 33a of the fitting member 33 and the groove 43a of the fitting receiving member 43 are fitted to each other, and the fitting allows the clamp jig 31 to be guided to a predetermined clamp position to clamp the work 103 with high accuracy.

In subsequent step S110, the process control panel 55 causes the welding robot 50 to operate and perform spot welding (pre-assembly welding) on the work 103 clamped by the clamp jig 31.

After the spot welding on the work 103 is finished, the flow proceeds to step S111 where the process control panel 55 causes the actuator 40d to operate and release (unlock) the locked state of the clamp jig 31 made by the locking mechanism 40. Thus, the clamped state of the work 103 made by the clamp jig 31 is released.

In subsequent step S112, the process control panel 55 retracts the clamp jig 31 from the vehicle body 100 by control on the articulated arm 32 of the clamp robot 30.

In subsequent step S113, the process control panel 55 causes the air cylinder 21 to operate and release (unlock) locking of the leg 9 by the frame locking mechanism 20.

In subsequent step S114, the process control panel 55 causes the movable jig frame 6a of the side jig frame 6 to operate and retract the side reference pin 16 from the side structure 102.

In subsequent step S115, the process control panel 55 causes the upper jig transport robot 10 to operate and raise the upper jig frame 7 to a retract position.

In subsequent step S116, the process control panel 55 retracts the jig reference pin 15 from the jig frame 6 to unclamp the underfloor jig 5.

In subsequent step S117, the process control panel 55 transports the vehicle body 100 along with the underfloor jig 5, and the flow is exited.

According to the present implementation, the vehicle body manufacturing apparatus 1 includes: the jig frame structure 2 in which the upper jig frame 7 is replaceably disposed from the several upper jig frames 7 according to a vehicle type; the clamp jig 31 that clamps the work 103 of the vehicle body 100 supported by the jig frame structure 2; the articulated arm 32 that supports the clamp jig 31 movably relative to the vehicle body 100; the fitting member 33 provided in the clamp jig 31; and the fitting receiving member 43 that is provided in the upper jig frame 7 and guides the clamp jig 31 to a predetermined clamp position of the vehicle body 100 by fitting to the fitting member 33. With this configuration, the vehicle body manufacturing apparatus 1 is capable of clamping a work of multiple types of vehicle body with high accuracy and flexibility.

That is, the clamp jig 31 is supported by the articulated arm 32, thereby allowing the clamp jig 31 to approach to the work 103 of the vehicle body 100 with high flexibility. In addition, the upper jig frame 7 included in the jig frame structure 2 is replaceable according to a vehicle type, and thus the fitting receiving member 43 is disposed at an optimal position according to the vehicle type and the fitting member 33 fixedly provided in the clamp jig 31 is fitted to the fitting receiving member 43, thereby allowing the clamp jig 31 to be disposed at a predetermined clamp position with high accuracy even when the articulated arm 32 is used.

The present invention is not limited to the implementation described above and various modifications and changes may be made, and those modifications and changes are also within a technical scope of the present invention.

For instance, a configuration as illustrated in FIG. 11 may be adopted in which the fitting member 33 is fixedly provided in part of the clamp jig main body 31*a*, a link mechanism 31*e* is connected to the other end of the clamp lever 31*b*, and when part of the clamp jig main body 31*a* is clamped between the locking mechanism main body 40*a* and the locking lever 40*b*, the end of the locking lever 40*b* is pressed against the link mechanism 31*e*, which causes the clamp lever 31*b* to perform clamping operation.

The invention claimed is:

1. A vehicle body manufacturing apparatus comprising:
a jig frame structure in which at least one of multiple jig frames comprises a replaceable jig frame that is replaceable according to a vehicle type;
at least one clamp jig that clamps a work of a vehicle body supported by the jig frame structure;
an articulated arm that supports the at least one clamp jig movably relative to the vehicle body, the articulated arm attached to the at least one clamp jig at a first end of the at least one clamp jig;
a fitting member provided at a second end of the at least one clamp jig; and
a fitting receiving member that is provided in the replaceable jig frame and guides the at least one clamp jig to a predetermined clamp position of the vehicle body by fitting to the fitting member, the fitting receiving member being shaped such that the fitting member can fixedly attach to the fitting receiving member.

2. The vehicle body manufacturing apparatus according to claim 1, wherein the at least one clamp jig clamps the work in conjunction with fitting between the fitting member and the fitting receiving member.

3. The vehicle body manufacturing apparatus according to claim 1, wherein the replaceable jig frame comprises an upper jig frame that is disposed in an upper portion of the jig frame structure.

4. The vehicle body manufacturing apparatus according to claim 2, wherein the replaceable jig frame comprises an upper jig frame that is disposed in an upper portion of the jig frame structure.

5. The vehicle body manufacturing apparatus according to claim 1, wherein the fitting receiving member is detachably provided in the replaceable jig frame.

6. The vehicle body manufacturing apparatus according to claim 2, wherein the fitting receiving member is detachably provided in the replaceable jig frame.

7. The vehicle body manufacturing apparatus according to claim 3, wherein the fitting receiving member is detachably provided in the replaceable jig frame.

8. The vehicle body manufacturing apparatus according to claim 4, wherein the fitting receiving member is detachably provided in the replaceable jig frame.

9. The vehicle body manufacturing apparatus according to claim 1, wherein the at least one clamp jig includes:
a clamp jig main body connected to the articulated arm at the first end; and
a clamp lever rockably pivotally supported by the clamp jig main body, the clamp lever having the fitting member provided thereon.

10. The vehicle body manufacturing apparatus according to claim 1, wherein the fitting member is shaped as a protruding portion, and
wherein the fitting receiving member is shaped as a recessed portion.

11. The vehicle body manufacturing apparatus according to claim 1, wherein the fitting member is provided on a portion of the at least one clamp jig that is rockably pivotally supported by the at least one clamp jig.

12. The vehicle body manufacturing apparatus according to claim 1, wherein the articulated arm is fixedly attached to the at least one clamp jig at the first end, and
wherein the at least one clamp jig includes a portion that is pivotally supported by the at least one clamp jig and includes the fitting member at the second end.

13. The vehicle body manufacturing apparatus according to claim 1, wherein the first end of the at least one clamp jig is further from the fitting receiving member than the second end of the at least one clamp jig.

14. The vehicle body manufacturing apparatus according to claim 1, wherein the fitting member mates to the fitting receiving member.

15. The vehicle body manufacturing apparatus according to claim 1, wherein the fitting receiving member is provided in the replaceable jig frame at a position such that the at least one clamp jig is guided to a predetermined clamp position of the vehicle body when the fitting member provided on the at least one clamp jig contacts the fitting receiving member.

16. The vehicle body manufacturing apparatus according to claim 1, wherein the fitting receiving member is provided on the replaceable jig frame in a position facing the fitting member.

17. The vehicle body manufacturing apparatus according to claim 1, wherein the fitting member is shaped as a V-shape protrusion, and wherein the second fitting member is shaped as a V-shaped groove.

18. The vehicle body manufacturing apparatus according to claim 1, wherein the at least one clamp jig includes a movable part having the fitting member disposed thereon.

19. The vehicle body manufacturing apparatus according to claim 1, wherein the fitting member is shaped as a protruding portion, and
   wherein the fitting receiving member is shaped as a recessed portion such that the protruding portion shape of the fitting member mates with the recessed portion.

\* \* \* \* \*